United States Patent [19]

Suman et al.

[11] Patent Number: 5,180,089

[45] Date of Patent: Jan. 19, 1993

[54] UNIVERSAL VEHICLE ACCESSORY MOUNTING SYSTEM

[75] Inventors: Michael J. Suman; Stewart D. Reed; Dale J. Frye, all of Holland; Russell L. Clark, Zeeland, all of Mich.

[73] Assignee: Prince Corporation, Holland, Mich.

[21] Appl. No.: 809,225

[22] Filed: Dec. 17, 1991

Related U.S. Application Data

[63] Continuation of Ser. No. 503,514, Apr. 2, 1990, abandoned.

[51] Int. Cl.$^5$ ................................................. B60R 7/00
[52] U.S. Cl. .......................... 224/42.45 R; 224/42.42; 224/42.44; 296/37.13; 296/153; 211/94
[58] Field of Search ............... 224/42.45 R, 42.46 R, 224/42.43, 42.44, 42.42; 248/221.14; 296/37.13, 153, 37.7, 37.8, 37.12; 211/94, 88, 162

[56] References Cited

U.S. PATENT DOCUMENTS

| | | | |
|---|---|---|---|
| 1,149,541 | 8/1915 | Rees | 211/88 |
| 3,019,954 | 2/1962 | Faltin | 224/42.46 R |
| 4,664,267 | 3/1987 | Clark | 211/94 |
| 4,869,378 | 9/1989 | Miller | 211/94 |
| 4,942,498 | 7/1990 | Toussaint | 211/94 |

FOREIGN PATENT DOCUMENTS

| | | | |
|---|---|---|---|
| 495451 | 8/1953 | Canada | 211/94 |
| 7507037 | 6/1975 | Netherlands | 248/221.4 |

*Primary Examiner*—Linda J. Sholl
*Attorney, Agent, or Firm*—Price, Heneveld, Cooper, DeWitt & Litton

[57] ABSTRACT

A universal connector mechanically couples any one or more of a variety of accessories to a vehicle. The universal connector comprises a first mounting member, which can extend along a section of a vehicle such as a door panel, instrument panel or the like and can be mounted in recessed relationship to the vehicle. The universal connector also includes a second mounting member associated with each accessory and shaped to lockably and removably engage the first mounting member. In a preferred embodiment of the invention, at least one of the mounting members is made of a resilient material to allow a snap-fit interconnection of the two members.

15 Claims, 6 Drawing Sheets

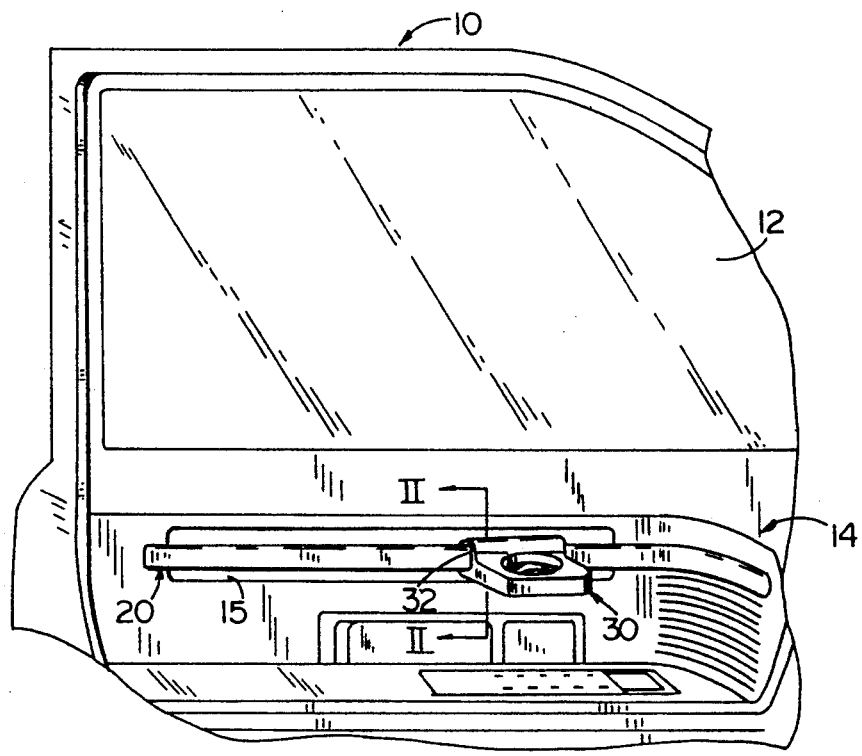
FIG. 1
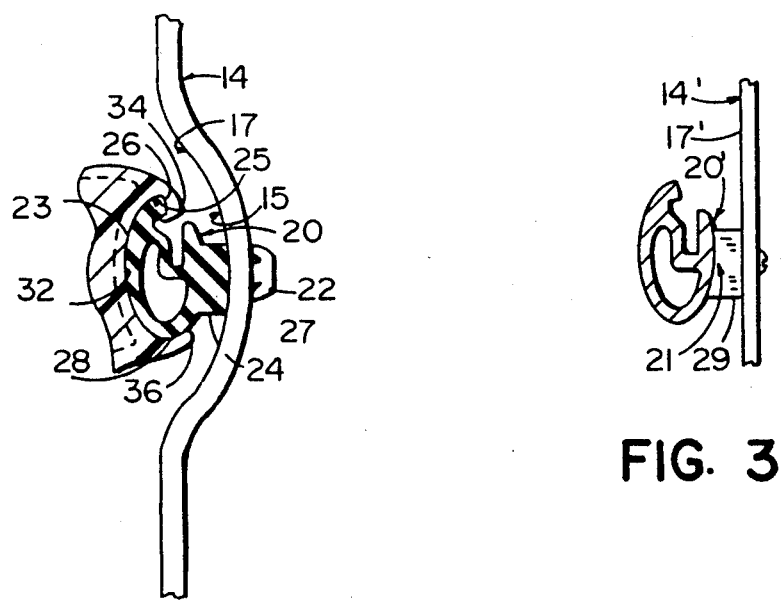
FIG. 2
FIG. 3

UNIVERSAL VEHICLE ACCESSORY MOUNTING SYSTEM

This is a continuation of co-pending application Ser. No. 07/503,514 filed on Apr. 2, 1990 now abandoned.

BACKGROUND OF THE INVENTION

The present invention pertains to vehicle accessories and particularly to a mounting system for removably mounting vehicle accessories at different vehicle locations.

Modern vehicles have incorporated such optional features as integrated cupholders built into the vehicle armrest or even within door panels of the vehicles. Vehicles commonly include such accessories as integrated tape storage containers and coin holders typically mounted in vehicle consoles. A variety of aftermarket accessories such as waste bins and cupholders are likewise available.

To date, however, there has been no known effort to provide an accessory system integrated with the vehicle in which multiple different accessories can be selectively installed by the user of a vehicle or by different users of the same vehicle to fit their particular needs. Thus, presently, a consumer will typically order a vehicle with a desired number of permanently installed optional accessories or a particular convenience package which may include accessories which are desired and some which are not with the consumer paying for the overall package. Vehicles have not to date incorporated the flexibility of allowing the purchaser to easily select only desired optional accessories, or subsequent to the purchase of the vehicle; add on different accessories or remove previously requested accessories and still retain the original vehicle design appearance.

SUMMARY OF THE PRESENT INVENTION

The system of the present invention provides a universal connector which mechanically couples any one or more of a variety of accessories which engage the connector for removably mounting one or more of such accessories to a vehicle. The connector and accessories may also include electrical interconnections for selectively providing power to the vehicle accessory such that powered accessories can also be incorporated in the system. In a preferred embodiment of the invention, the universal connector comprises an extruded mounting member, which can extend along a section of a vehicle such as a door panel, instrument panel, or the rear of the front seats for use by rear seat passengers. The extruded member can be designed to be mounted in recessed relationship to the vehicle if incorporated as original equipment in the vehicle design or can be mounted to standoff from the vehicle surface if added as an aftermarket item or if desired as an original equipment design. By providing an elongated mounting member, a plurality of accessories can be simultaneously attached for use by one or more vehicle occupants.

In a preferred embodiment of the invention also, the universal connector comprises first and second mounting members in which one of the members is mounted on one or the other of the vehicle and accessory and the second mounting member is mounted on the other one of the accessory and vehicle and is shaped to lockably and removably engage one another for removable attachment of the accessory. In a preferred embodiment of the invention, at least one of the mounting members is made of a resilient material to allow a snap-fit interconnection of the two members. With such construction, vehicle owners can selectively use a number of accessories at different locations in the vehicle as desired and selectively purchase or add accessories subsequent to the original purchase of the vehicle while retaining an original equipment appearance to the vehicle interior design. Such a system therefore allows the vehicle purchaser to pay for only those accessories which are desired to be used and add accessories at a later date if desired. Also, this system allows the user the flexibility to configure the interior differently for daily use or for trips. Thus the overall costs to the purchaser bears a direct relationship to the purchaser's demands and such a factor together with the convenience of the operational system makes it an attractive selling feature of the vehicle.

These and other features, objects and advantages of the present invention, will become apparent upon reading the following description thereof together with reference to the accompanying drawings in which:

BRIEF DESCRIPTION OF THE DRAWINGS

FIG. 1 is a fragmentary perspective view of a vehicle and particularly a door panel incorporating the system of the present invention;

FIG. 2 is an enlarged fragmentary cross-sectional view taken along section lines II—II of FIG. 1;

FIG. 3 is an enlarged fragmentary vertical cross-sectional view of an alternative embodiment of one of the members of the FIG. 2 embodiment;

DETAILED DESCRIPTION OF THE PREFERRED EMBODIMENT

Figure 4:
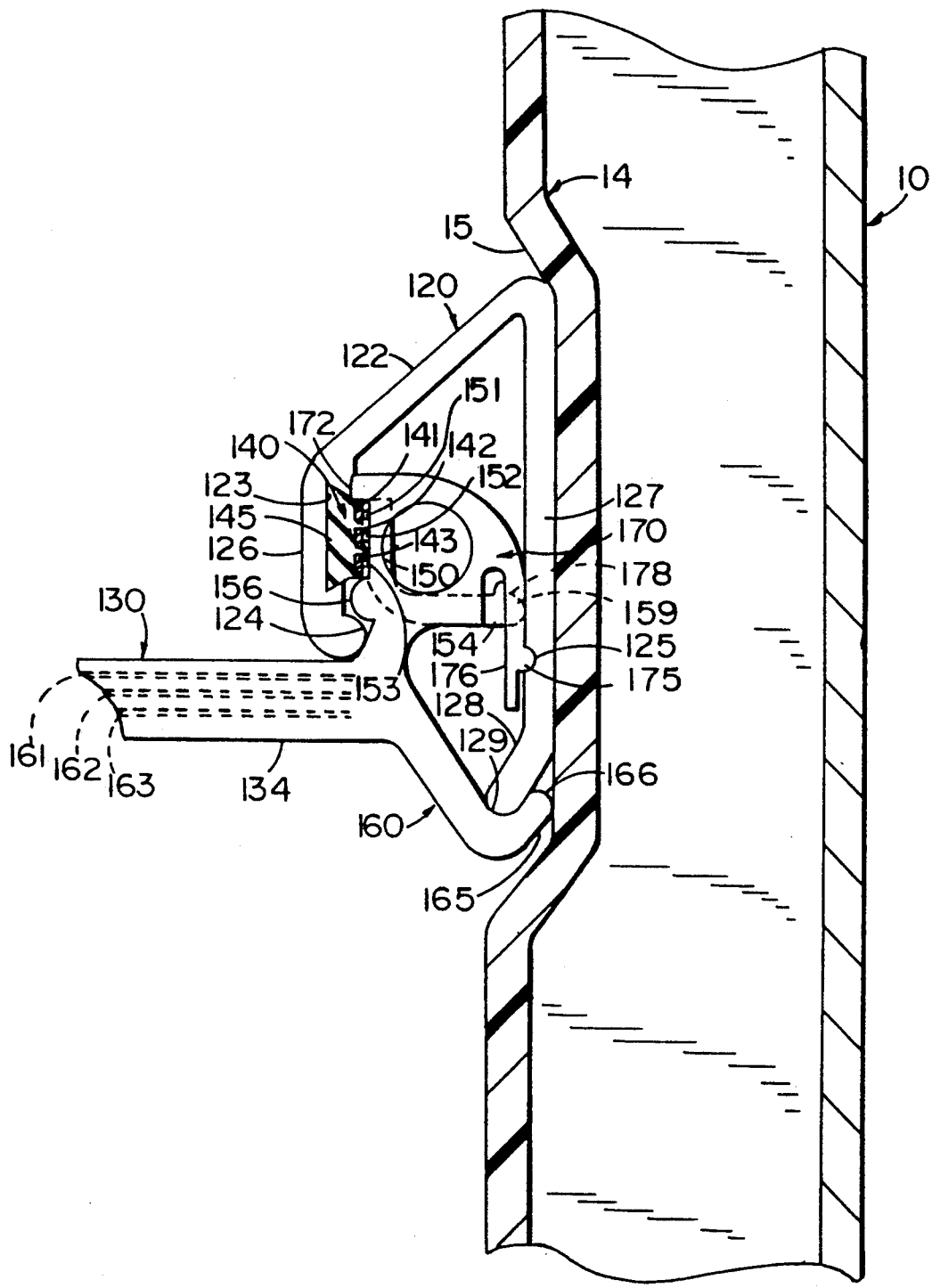
FIG. 4 is an enlarged fragmentary vertical cross-sectional view of an alternative embodiment of the universal connector of the system of the present invention illustrating a electrically powered system.

Referring initially to FIG. 1 there is illustrated in its broadest form, the universal mounting system of the present invention illustrated as mounted in a vehicle on the door panel 14 of a vehicle door 10. Panel 14 is a driver's side panel typically including a side window 12 below which there is mounted an elongated generally horizontally extending first mounting member 20 of the universal connector embodying the present invention.

Member 20 extends in generally horizontal relationship along a substantial portion of the door 10 and is secured to the interior door trim panel 14 in alignment with and extending in front of an integral concavely formed recess 15 in panel 14 as best seen in FIG. 2. Member 20 comprises as best seen in FIG. 2 an extruded member which is secured to the door panel 14 by a plurality of spaced fasteners 22 which can be screw-type fasteners, snap-type fasteners or any other suitable conventional fasteners for rigidly attaching the elongated extruded member 20 to the door panel 14. Member 20 has a generally oval cross-sectional configuration as best illustrated in FIG. 2 which is spaced from the outer surface 17 of panel 14 by a integral standoff or stem 24. The first member 20 thus is defined by structures having a major axis which extends in a vertical direction and is substantially longer than its orthogonal mirror axis which extends longitudinally. In the embodiments shown in FIGS. 1–3, this relationship is approximately 2:1, such that member 20 defines two vertically spaced mounting support areas 25 and 28 (FIG. 2).

The first mounting member 20 matingly snap-fits within a second mounting member defining a socket 32 formed in a cupholder accessory 30 for allowing the removable attachment and detachment of the cupholder 30 to the door panel 14. In the preferred embodiment illustrated, the oval first mounting member is defined by an oval-curved integral outer wall 23 (FIG. 2) terminating in an upper free-standing lip 25 having a vertical edge 26. The lower portion of wall 23 integrally extends into stem 24 and an offset integral intermediate support wall 27 joins the inner surface of outer wall 23 to the center portion of stem 24 to provide rigidity to the upper portion of the connector 20 and yet allow some flexibility.

In the preferred embodiment illustrated in FIGS. 1 and 2 the first mounting member 20 can be extruded of a suitable polymeric material such as a Nylon or an acetal as illustrated in FIG. 2. It also could be extruded of a material such as aluminum which could be anodized or otherwise covered with a finish which integrates the appearance of the universal connector first mounting member 20 with that of the vehicle interior.

Central to the design of the universal connector system is a mounting member which is preferably permanently attached to the vehicle and which presents support surfaces which removably and lockably engage a mating connector on a number of vehicle accessories.

In FIGS. 1 and 2 one such accessory 30 is illustrated as being a cupholder which includes the second mounting member 32 extending longitudinally along one edge of the cupholder facing the vehicle door panel 14 as illustrated in FIG. 1. Member 32 defines a socket which has a complementary oval interior surface. The socket terminates at its top with a downwardly projecting lip 34 which fits over and engages lip 26 on mounting member 20. At its lower edge, socket 32 includes an outwardly projecting lip 36 which can be slightly upwardly curved to engage the lower curved edge 28 of mounting member 20 and partially circumscribe the oval lower edge. The cupholder 30 may be generally of the type disclosed in U.S. Pat. No. 4,818,017 issued on Apr. 4, 1989, the disclosure of which is incorporated herein by reference. Such a cupholder is modified to include the integral second mounting means or socket 32 thereon which is adapted to snap-fit over the first mounting means 20.

A similar second mounting means 32 such as the socket, can be integrally formed on any number of other accessories such as illustrated in the remaining FIGS. 6–10 as described in greater detail below in connection with an alternative mounting structure. Each of the accessories so mounted will include an elongated generally oval configured mating structure with a downwardly projecting upward lip such as lip 34 and an outwardly and slightly upwardly extending lower lip 36 as shown in FIG. 2. For attachment and removal of the cupholder 30 illustrated in FIGS. 1 and 2, the upper lip 34 is first positioned over lip 26 with the cupholder upwardly tilted from the door panel. Subsequently it is tilted downwardly and inwardly until the lower lip 36 engages the undersurface and extends beyond the lower edge 28 of the first mounting means 20. The cupholder socket 30 is made of a suitable resilient polymeric material such a polycarbonate or ABS. The oval profile of the first mounting member of the system illustrated in FIGS. 1 and 2, provides a vertical dimension approximately twice that of the horizontal dimension and therefore provides improved stability for the snap-on mounting of accessories such as cupholder 30.

An alternative embodiment of the extruded member 20 illustrated in FIGS. 1 and 2 is shown in FIG. 3 in which the extrusion is identified as first mounting member 20′ and has substantially the same cross-sectional configuration as member 20 with the exception of the integral stem. In FIG. 3 the extrusion is substantially oval and is mounted in spaced relationship to the surface 17′ of a door panel 14′ either within a recess or in flush mounting relationship by means of a plurality of spacers 29. This provides a spaced slot 21 between the surface 17′ of the door panel and the facing surface of the connector 20′ such that the elongated first mounting member 20′ can serve as a grab handle if mounted to a door panel such as panel 14 as shown in FIG. 1 or 14′ in FIG. 3. In the FIGS. 1–3 embodiment, one or two spacers may be incorporated for securing the mounting member 20 in the area of recess 15 and conventional fastener means provided at the opposite ends. As a result, the connector serves the dual function of providing a door closing pull bar as well as a mounting connector for vehicle accessories. The spacers 29 can take the form of a substantially thick washer or spacer block which can be bonded to the first surface of member 20′ and subsequently a fastener such as a screw 22 or the like, inserted to secure the mounting member 20′ to the door panel 14′.

In the embodiments shown in FIGS. 1–3, the first mounting member comprises a male member which is matingly received by female socket in the accessory. The first mounting member is secured to the vehicle in a permanent fashion to allow one or more vehicle accessories such as the cupholder 30 illustrated in FIGS. 1 and 2 to be mounted thereto. In other embodiments the first mounting member which is secured to the vehicle may take the form of a female socket or other forms of male connectors. Other embodiments which also include electrification means for providing electrical power to selected accessories are illustrated in FIGS. 4 and 5 with FIG. 4 being described first.

Figure 5:
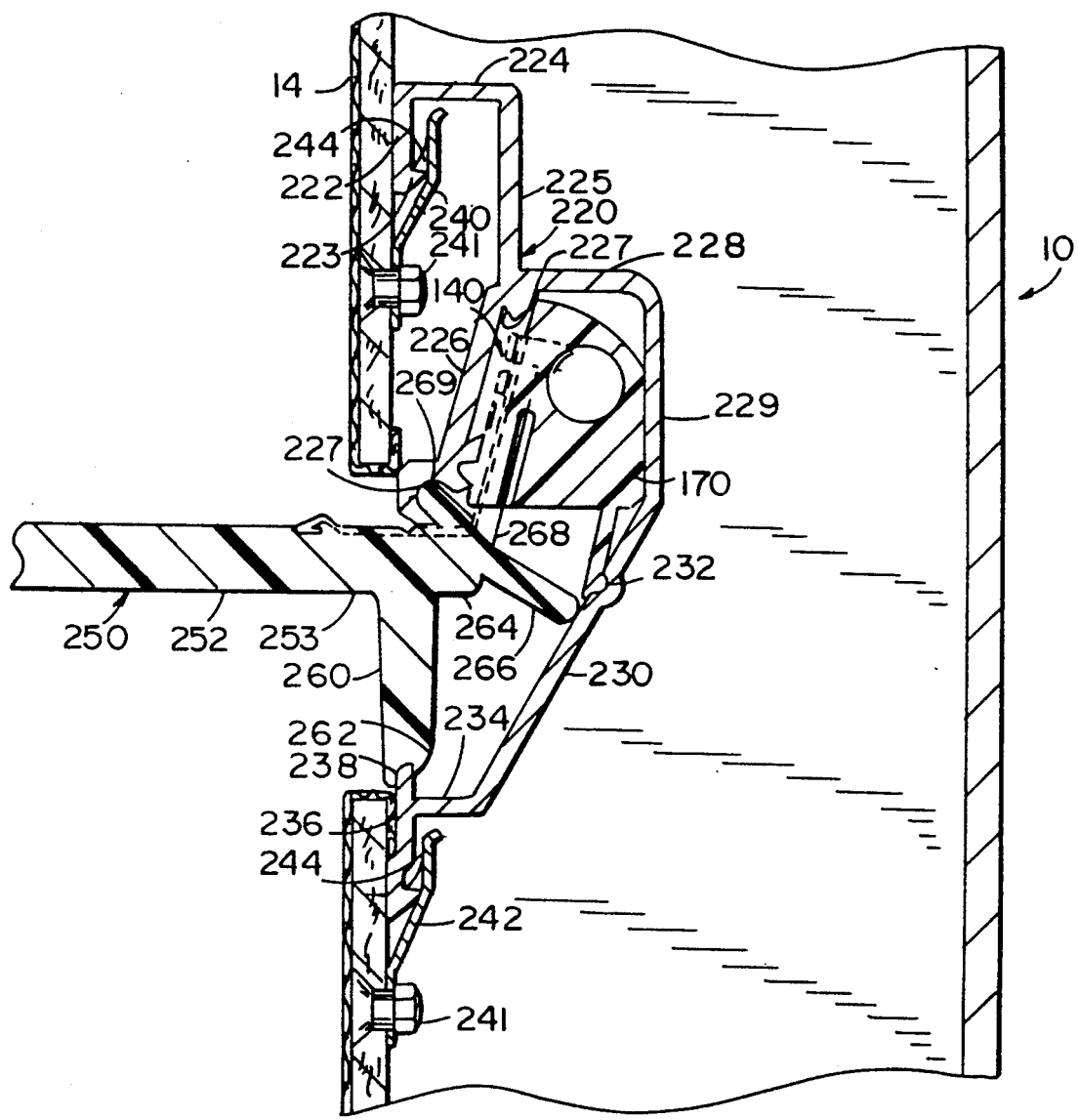
FIG. 5 is an enlarged fragmentary vertical cross-sectional view of yet another embodiment of the universal connector of the present system.

Referring now to FIG. 4 there is shown a vehicle door 10 having a door panel 14 with a first mounting member 120 secured within a recess 15 of the door panel 14 by means of a plurality of spaced conventional fasteners such as screws or snap-in fasteners (not illustrated). In the embodiment shown in FIG. 4 member 120 is an extruded member and comprises a generally inverted V-shaped member having a first or outer leg section 122 extending inwardly at about a 40° angle and then vertically downwardly at section 126. Leg 126 terminates in an inwardly curved and rounded tip 124. The inner surface of leg 126 includes a dovetailed slot 123 formed therein for receiving an electrical conductor assembly 140 including a mating dovetail-shaped contact pad 145 made of an insulating material which extends along the length of the longitudinally extending member 120 (member 120 extends into and out of the drawing of FIG. 4). Member 120 can be mounted as illustrated in FIG. 1 or recessed as seen in FIGS. 6–11 to extend along a length of the interior of the vehicle. Contact pad 145 includes formed therein three longitudinally extending electrical conductors 141, 142 and 143 which are coupled to the vehicle's electrical system with conductor 141 being coupled to the +12 volt supply, conductor 142 coupled to a switched supply voltage such as a courtesy light switch or the like, and conductor 143 constituting the ground conductor. The purpose of the electrical contact pad is to provide operating electrical supply voltage to an accessory coupled to the first mounting means 20 as described below.

Leg section 122 of member 120 terminates at the top with a sharp downward bend forming a vertically extending outer leg 127 which is mounted to the door pane 14. Leg 127 includes an inwardly formed end 128 having a rounded tip 129. A semi-cylindrical indentation 125 is formed on the inner side of leg 127 for purposes of receiving a light mounting socket 170 as also described below. Thus member 120 in FIG. 4 constitutes a generally concave receptacle or socket for receiving an accessory such as accessory 130 with the mounting means of accessory 130 constituting a pair of three integral sections including an upper vertically extending leg 150, an intermediate outwardly extending leg 154 and an integral lower downwardly and outwardly extending leg 160. The junction of leg 150 and leg 154 includes a rounded semi-cylindrical projection 156 which fits over the rounded end 124 of member 120 providing an interlock as illustrated in FIG. 4 against slippage. The upper inner surface of leg 150 includes electrical contacts 151, 152 and 153 which engage conductors 141, 142 and 143 respectively for providing electrical contact with the supply conductors. Electrical conductors 161, 162 and 163 are embedded or otherwise suitably mounted to the mounting stem 134 of accessory 130 and electrically coupled to the spring contacts 151, 152 and 153 respectively for supply operating power to the accessory. The accessory 130 is mounted to the mounting means 120 by inserting the upper leg 150 under and behind forward leg 126 such that the rounded projection 156 fits under the inwardly projecting end 124 of leg 126 while at the same time the upwardly and outwardly curved end 165 of leg section 160 having a rounded tip 166 is fitted under the inwardly and downwardly projecting leg 128 of the mounting bracket 120. The rounded end 159 of intermediate leg 154 pushes the contacts against the conductors and the weight of the accessory on stem 130 together with projection 156 securely holds the assembly together. Both mounting members 120 and 130 are made of resilient polymeric material with the dimensions selected for a relatively tight fit requiring some resilience in the leg members to achieve their interlocking an mating engagement. The accessory 130 can be removed by tilting upwardly and pushing downwardly on the stem 130 to remove the structure from the downwardly projecting concave opening provided by the first mounting means 120.

The light socket 170 has a cross-sectional configuration similar to that of a quadrant of a disc with an inwardly projecting rounded end 172 which rests above the contact member 140. The outer edge of socket 170 includes a downwardly extending spring leg 176 having a dimple 175 which extends into recess 125 for locking the socket in place. The spring arm 176 is formed in part by a slot 178 formed in the body of the lamp socket to allow the socket to be wedged into the mounting member 120. The socket includes conventional electrical contacts (not shown) for receiving a cartridge-type bulb and electrical contacts which engage conductor assembly 140 such that the lights connected with socket 170 are actuated by the actuation of the courtesy light switch of the vehicle to provide illumination along the mounting member 120 wherever it may by mounted in the vehicle. In the embodiment shown in FIG. 4 it is mounted along the door panel similar to that shown in FIG. 1 although as will be described below, it could be mounted at other locations in the vehicle as well.

FIG. 5 shows yet another embodiment of the first and second mounting means in which an entirely recessed mounting member 220 is disclosed and is mounted behind the panel 14 of a vehicle door 10. In this embodiment a plurality of spaced upper and lower mounting clips 240 and 242 are secured to the panel 14 by rivets 241 and 243 respectively and include upwardly and outwardly spaced legs with triangular inward projections 244 for snap interlocking with arrowhead-shaped tips 233 of member 220. Member 220 includes an upper leg section comprising a generally U-shaped structure having a first downwardly projecting vertical leg 222 with an arrowhead-shaped tip 223 which interlocks with member 244 as shown. Leg 222 is integral with a horizontally and outwardly extending leg 224 which communicates with a downwardly projecting leg 225. Leg 225 joins the central section of the mounting member 220 which includes an inwardly and downwardly angled leg section 226 having a dovetail slot 227 formed therein for receiving a conductor assembly 140 which can be identical to assembly 140 described above in connection with FIG. 4. Leg 226 terminates in a socket 227 at its lower most end and at its upper end communicates with the outwardly extending horizontal leg 228 which then extends downwardly in section 229 and inwardly and downwardly extending leg 230. Leg 230 includes a semi-cylindrical socket 232 for receiving a lamp housing 170 which is of identical construction to that described above in connection with FIG. 4. Leg 230 extends to a horizontally extending end 234 which terminates in a lower vertically extending leg section 236. The upper end of vertical leg 236 includes a rounded corner 238 which interfits with the mounting means for the accessory 250.

The accessory 250 includes a stem 252 which extends to the accessory itself which can be any of the types shown in FIGS. 6–11 and includes mounting means with three legs at its end 253. Accessory 250 includes the second mounting means which include a downwardly depending leg 260 with a recess 262 which mates against edge 238 of member 220. Recess 262 is formed in the bottom of leg 260 which curves upwardly and integrates at a junction section 264 with a downwardly and outwardly extending intermediate leg 266 which urges against leg 230 to urge the upwardly and outwardly inclined leg 268 and its rounded projection 269 into seating engagement within socket 227. Leg 268 includes electrical contacts such as contacts 151, 152 and 153 of the embodiment shown in FIG. 4 which engage the conductors of assembly 140 for supplying electrical current to electrify the accessories such as accessory 250.

Thus with the embodiments shown in FIGS. 4 and 5, the first mounting means which is positioned on the vehicle are concave sockets which receive the ends of the mounting means mounted on each of the accessories. In all of the embodiments, the accessories include legs or other contact members which either fit within or circumscribe the mounting member of the vehicle. As with the FIG. 4 embodiment, the components of the FIG. 5 embodiment is made of resilient polymeric material. Member 220 can also be extruded of aluminum, or made of Nylon or acetal while member 250 can be made of a polycarbonate or an ABS material or other suitable polymeric material if desired.

Figure 6:
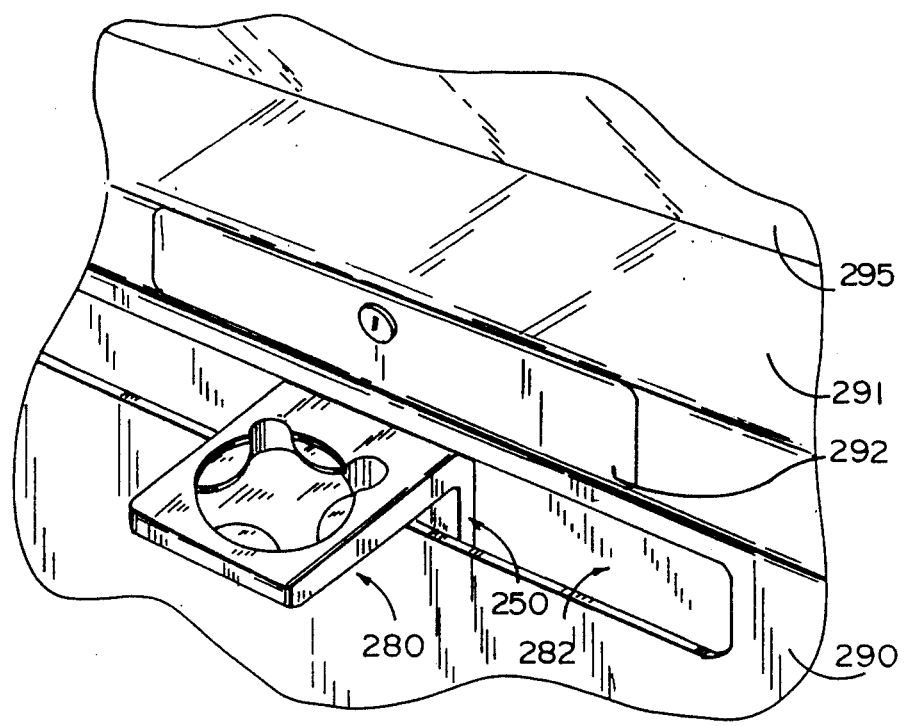
FIG. 6 is a fragmentary perspective view of a vehicle instrument panel showing a cupholder embodying the system of the present invention.
Figure 7:
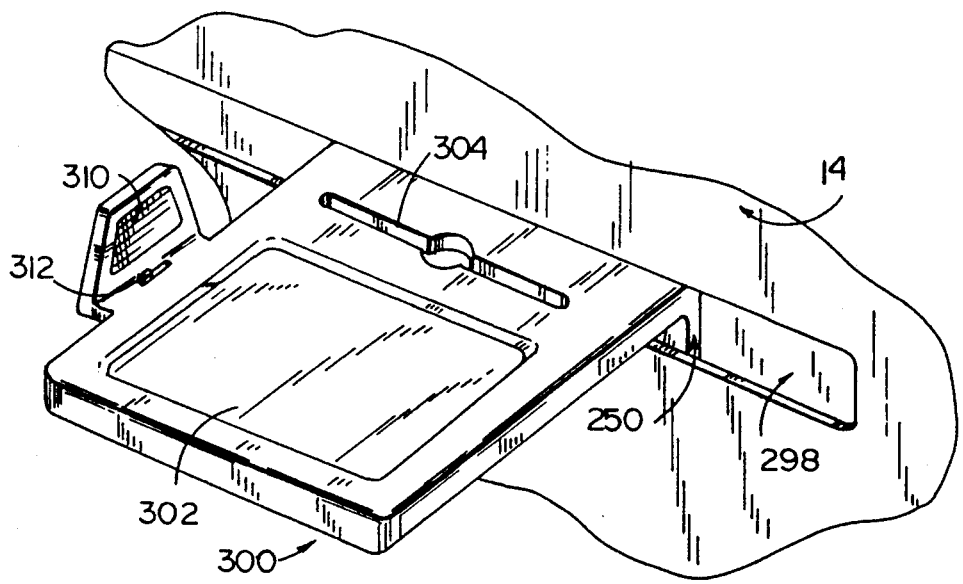
FIG. 7 is a fragmentary perspective view of a vehicle door panel showing an illuminated writing table embodying the system of the present invention.
Figure 8:
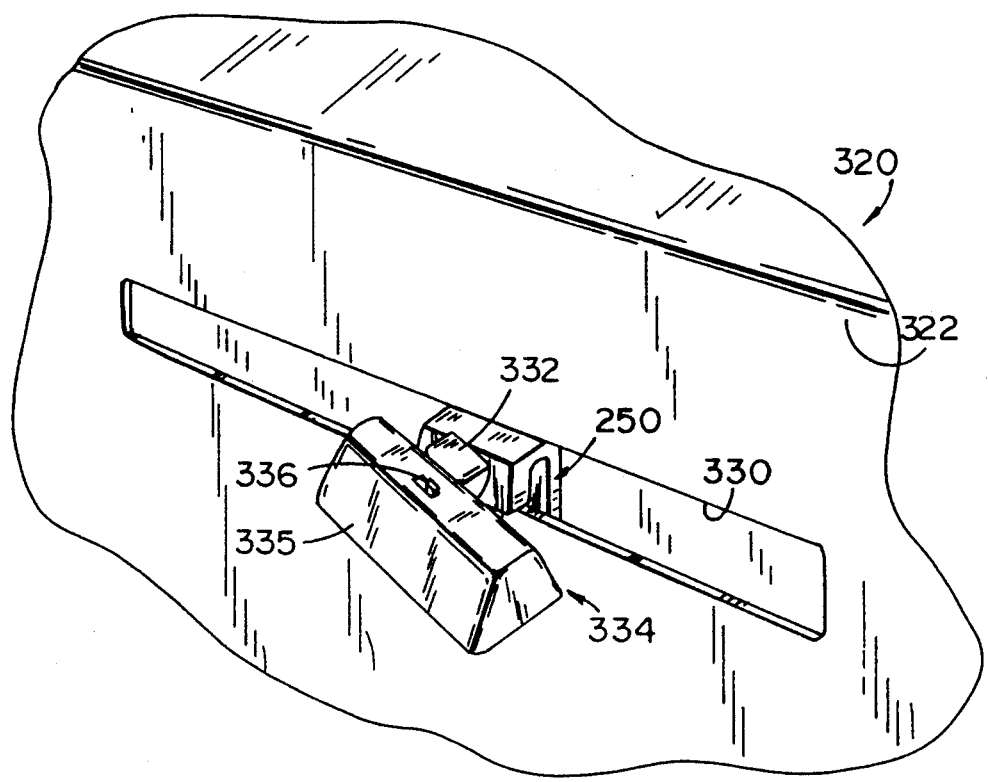
FIG. 8 is a fragmentary perspective view of the back of a vehicle seat showing a pivoted light embodying the system of the present invention.
Figure 9:
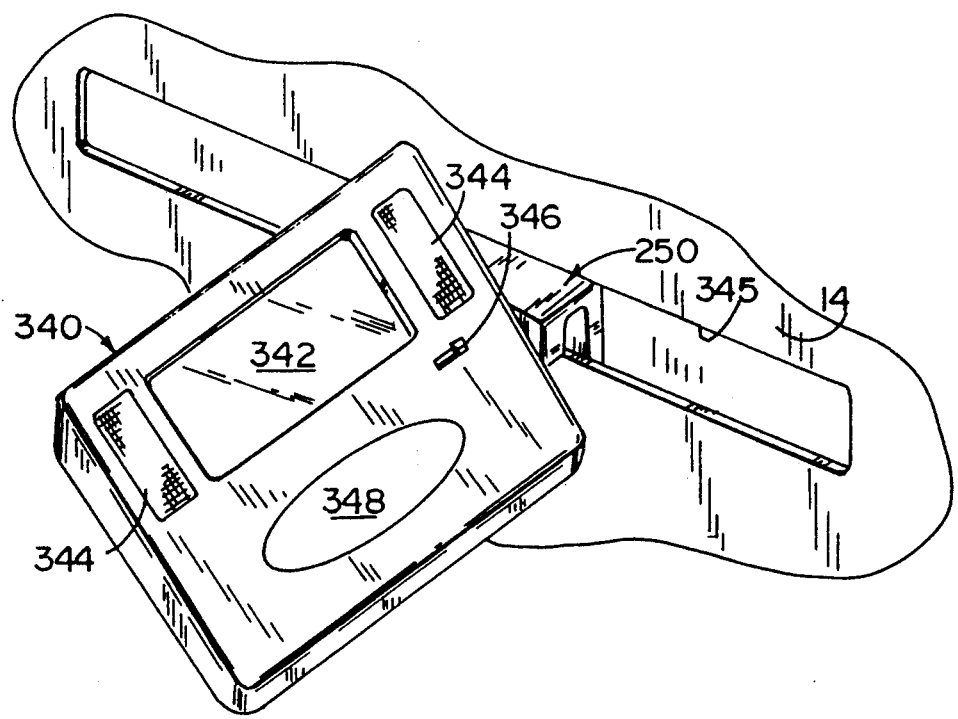
FIG. 9 is a fragmentary perspective view of a door panel including an illuminated vanity mirror and tissue dispenser embodying the system of the present invention.
Figure 10:
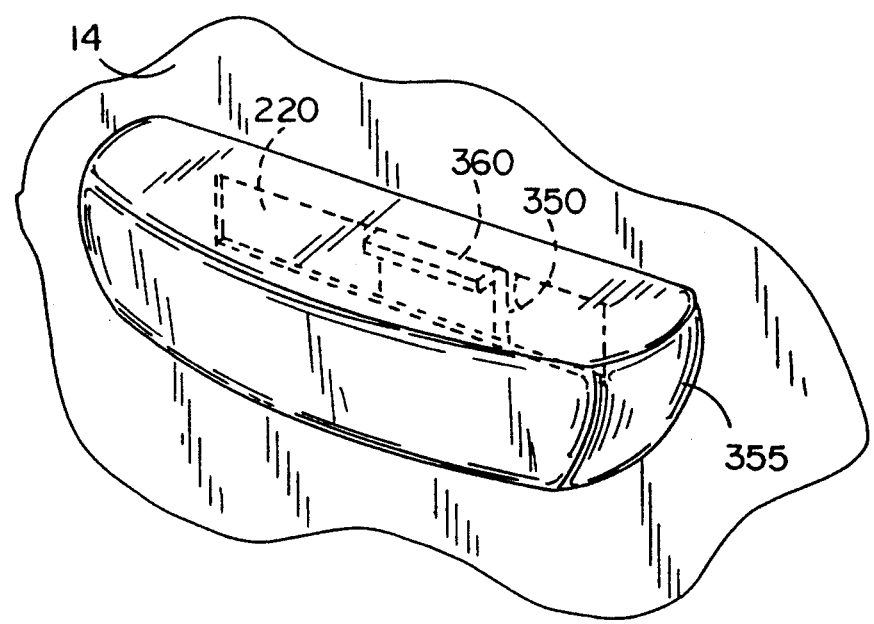
FIG. 10 is a fragmentary perspective view of a vehicle door panel with an accessory armrest embodying the present invention.
Figure 11:
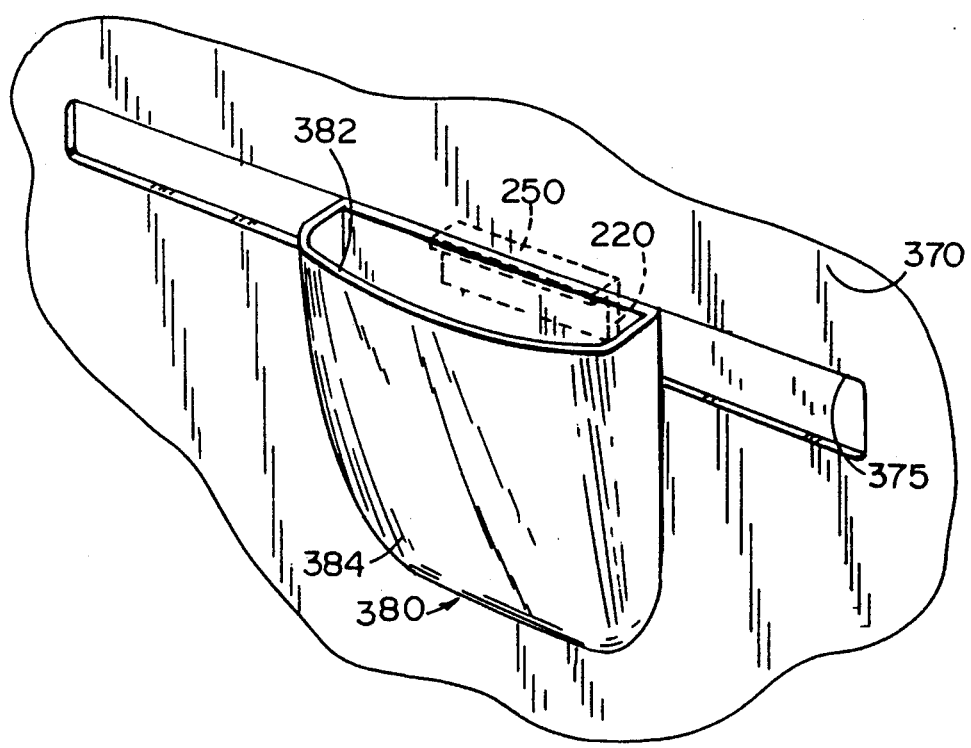
FIG. 11 is a fragmentary perspective view of a vehicle with a waste receptical accessory embodying the present invention.

The various applications of the mounting structure shown in FIGS. 1-5 are illustrated in FIGS. 6-11. In FIG. 6, a recessed mounting assembly is provided for a cupholder 280 which can be of the type described above in the U.S. Pat. No. 4,818,017 with the exception of the mounting assembly 250 which is of the type shown in FIG. 5. The recess 282 for receiving mounting member 220 is formed in the instrument panel 290 of a vehicle underneath a glovebox 292 and below the dashboard 294 and windshield area 295. Recess 282 and the mounting assembly 220 which is mounted therein can extend along a significant portion of the instrument panel in the lower portion thereof such that multiple cupholders 280 can be mounted thereto or other vehicle accessories such as a trash bin as illustrated in FIG. 11 or the light assembly as shown in FIG. 8.

In FIG. 7, a vehicle door panel 14 is shown with a recess 298 formed therein for a mounting member such as member 220. An accessory 300 such as a writing tray having a source of illumination 310 comprising a light source and lens which can be switched on and off by switch 312 is provided along the forward edge of the writing surface 302. A recess 304 is provided for holding pencils, notepads and the like for the tray which can be snap-fitted into position within the mounting member mounted within recess 298 of the door panel as shown in FIG. 5. Thus the stub section 250 shown in FIG. 5 joins the tray 300 to the mounting bracket of the type shown in FIG. 5. Naturally the mounting brackets for the FIGS. 6 and 7 and the remaining embodiments can be of the type shown in FIGS. 1-4 as well.

FIG. 8 illustrates another application of the universal mounting system of the present invention in which the rear 322 of seat 320 of a vehicle seat such as one of the front seats is shown and includes a recess 330 into which a mounting member 220 is mounted and to which a second mounting member including a section 250 and other structure like that shown in FIG. 5 is removably mounted. Pivotally mounted to the stem 250 by a conventional pivot mount 332 is a lamp 334 which includes a source of illumination such as a light bulb and a switch 336 for the actuation of the lamp. The lamp 334 is shown from the top showing the lamp shade or housing 335 into which the lamp and underlying lens if desired is mounted. Suitable electrical coupling between the conductor assembly 140 of the mounting member and the lamp are provided as disclosed earlier in connection with FIGS. 4 and 5.

In FIG. 9, another door panel 14 is shown in which an illuminated mirror and storage case such as a tissue dispenser 340 is mounted. Case 340 includes a vanity mirror 342 and a pair of light sources 344 with a suitable actuating switch 346 for the actuation of the light sources to provide illumination for use of mirror 342 under low ambient light conditions. The lower end of the housing defining case 340 includes an aperture 348 and storage area for receiving a box of tissues. For such purpose, a panel (not shown) on the back of the case 340 is provided for access for installing and removing boxes of tissues. A conventional pivot bracket mounts case 340 to mounting member 250 which couples to a mounting member 220 positioned behind recess 345 in panel 14.

FIG. 10 shows yet another embodiment of the invention in which a side door panel 14 is disclosed and includes any one of the mounting arrangements disclosed in FIGS. 1-5. The panel thus includes a first mounting member 220 mounted within a recess 350 with door panel and a second mounting member 360 shown schematically in the FIG. which is mounted to a padded armrest 355. Mounting member 360 is the same as member 250 shown in FIG. 5. This permits the armrest to be selectively mounted to the door panel, which could be a door panel for any of four doors, and permits the forward and aft adjusted location of the armrest in the vehicle as desired by the vehicle occupant. Naturally mounting member 220 must be located below the window of the door in an area generally illustrated by the cupholder 30 in FIG. 1. The armrest 355 could employ a socket-type mount as shown in FIG. 2 for securing the armrest in the area aft of cupholder 30 of FIG. 1.

FIG. 11 shows yet another embodiment of the invention in which a side panel 370 near the floor and forward of one of the seats of the vehicle is shown and includes a first mounting member 220 within a slot 375 and to which there is coupled an accessory such as a polymeric molded waste receptacle 380 via a second mounting member 250. Receptacle 380 can include a rigid rim 382 and integrally formed curved walls 384 to define an enclosed housing or simply be a frame integral with the mounting means 250 which lockably mates with member 220 and receives a disposable plastic bag for use as a waste receptacle. The receptacle 380 naturally can be moved to any location in a vehicle and the vehicle owner can purchase any number of receptacles for use in the front and rear seat areas as desired.

As can be seen with the unique universal coupling system of the present invention a variety of different vehicle accessories can be utilized in connection with a plurality of first mounting means either recessed or extending from the surface of various areas of the vehicle to provide the vehicle user with a great deal of flexibility in selecting powered and unpowered accessories for use in the vehicle. It will become apparent to those skilled in the art the various modifications to the preferred embodiment of the invention as described herein and can be made without departing from the spirit or scope of the invention as defined by the appended claims.

The embodiments of the invention in which an exclusive property or privilege is claimed are defined as follows:

1. A system for mounting one or more of a plurality of vehicle accessories to the interior of a vehicle comprising:

a vehicle interior panel mounted in and forming a part of the vehicle;

said vehicle panel having an exposed surface facing the interior of said vehicle;

an elongated first support member having means for releasably receiving an attachment member of an accessory, said first support member including a curvilinear convex surface facing away from said interior panel and a lip formed along the upper edge and along the length of said support member, said lip being hidden from view by said convex surface, means for mounting said first support member to a portion of said exposed surface of said vehicle panel in relationship to said vehicle panel such that said first support member extends substantially along and parallel to said exposed surface of said vehicle panel with said lip spaced from said exposed surface whereby said first support member provides a means for mounting an accessory while providing a decorative trim member for the vehicle; and at least one accessory having an attachment member with a length significantly less than the length of said first support member such that said accessory can be mounted over said first support member at a plurality of positions along the length of said first support member, a convex surface of said attachment member adapted to matingly engage said support member, said attachment member including a lip for engaging said lip on said support member when said surface of said attachment member engages with said first support member.

2. The system as defined in claim 1 wherein said means for securing said first support member comprises means for securing said first support member in a position such that said means for releasably receiving an attachment member extends from the surface of said vehicle in a direction toward the vehicle interior.

3. The system as defined in claim 2 wherein said means for securing said first support member is integral with said first support member.

4. The system as defined in claim 1 wherein said means for securing said first support member comprises stand-off means.

5. The system as defined in claim 1 wherein said attachment member surface is C-shaped, said attachment member being resilient whereby said attachment member forming said C-shaped surface snap-fits over said first support member.

6. The system as defined in claim 1 wherein said means for securing said first support member comprises means for securing said first support member in a position such that said means for releasably receiving an attachment member is recessed.

7. The system as defined in claim 1 wherein said vehicle accessory comprises a cupholder.

8. The system as defined in claim 1, wherein said first support member is generally oval in cross-sectional shape and said attachment member comprises a resilient C-shaped member which snap-fits over said oval first support member whereby said second support member is supported on said first support member such that said second support member extends orthogonally to said first support member.

9. A mounting system for removably mounting at least one of a plurality of vehicle accessories to the interior of a vehicle comprising:

a vehicle interior panel mounted in and forming a part of the vehicle;

said vehicle panel having an exposed surface facing the interior of said vehicle;

a first mounting member including securing means for securing said first mounting member to a portion of the exposed surface of said panel, said first mounting member including at least a pair of spaced-apart support areas on the top and bottom edges of said member, the first mounting member having a front curvilinear convex surface facing the interior of the vehicle and a back surface spaced from and facing said panel, said back surface including said pair of spaced-apart support areas, said securing means for securing said first mounting member being located intermediate said spaced-apart support areas whereby said first mounting member is supported on said panel substantially along and parallel to said exposed surface of said panel and said convex surface hides said spaced apart support areas of the back surface to provide a decorative trim member for said panel;

a vehicle accessory for attachment to the vehicle; and a second mounting member secured to said vehicle accessory and having a pair of spaced contact areas which engage said support areas of said first mounting member for removably and lockably mounting said vehicle accessory to said first mounting member, one of said spaced contact areas for engaging one of said pair of support areas and the other of said contact areas for engaging the other one of said pair of support areas.

10. The system as defined in claim 9 wherein said first mounting member comprises an elongated member for receiving a plurality of vehicle accessories along the length of said elongated member.

11. The system as defined in claim 9 wherein said vehicle accessory comprises a cupholder.

12. A vehicle accessory system for removably mounting at least one of a plurality of vehicle accessories to the interior of a vehicle comprising:

a vehicle interior panel mounted in and forming a part of the vehicle;

said vehicle panel having an exposed surface facing the interior of said vehicle;

a first mounting member including a top and a bottom on the exterior of said first mounting member, said top and bottom interconnected by an intermediate surface for facing the interior of the vehicle, said intermediate surface in cross-section being a continuous substantially uninterrupted line;

a supporting means for securing said first mounting member to a portion of the exposed surface of said vehicle interior panel such that said intermediate surface faces the interior of the vehicle and provides a decorative trim member for the vehicle interior;

a plurality of vehicle accessories for attachment to the vehicle; and a plurality of second mounting members with one of said second mounting members extending from each one of said vehicle accessories, each of said second mounting members having a pair of spaced contact areas which enclose said top and bottom of said first mounting member for removably mounting at least one of said vehicle accessories to said first mounting member, said mounting member including an intermediate area between said first and second contact areas for engaging said intermediate surface area of said mounting member.

13. The system as defined in claim 12 wherein said first mounting member comprises an elongated member for receiving a plurality of said vehicle accessories.

14. The system as defined in claim 12 wherein one of said vehicle accessories comprises a cupholder.

15. The system as defined in claim 12, wherein said first support member is generally oval in cross-sectional shape and said attachment member comprises a resilient C-shaped member which snap-fits over said oval first support member whereby said second support member is supported on said first support member such that said second support member extends orthogonally to said first support member.

* * * * *